US005331214A

United States Patent [19]

Mori et al.

[11] Patent Number: 5,331,214

[45] Date of Patent: Jul. 19, 1994

[54] LOAD CONTROL DEVICE HAVING ABNORMAL CONDITION DETECTING FOR SERIAL SIGNAL LINE, TRANSMITTER AND RECEIVER

[75] Inventors: Satoshi Mori; Makoto Shibahara, both of Aichi, Japan

[73] Assignee: Kabushiki Kaisha Tokai Rika Denki Seisakusho, Aichi, Japan

[21] Appl. No.: 871,443

[22] Filed: Apr. 21, 1992

[30] Foreign Application Priority Data

Apr. 22, 1991 [JP] Japan ............................ 3-036997[U]

[51] Int. Cl.$^5$ ............................................ H01H 35/00

[52] U.S. Cl. .................................... 307/116; 307/10.8; 307/125; 307/139

[58] Field of Search ..................... 307/10.1, 10.8, 112, 307/116, 117, 125, 139, 38, 39, 40; 315/82; 340/458, 641, 642

[56] References Cited

U.S. PATENT DOCUMENTS 3,881,128 4/1975 Douglas et al. ....................... 315/83

4,613,791 9/1986 Kurihara et al. ..................... 315/82

4,665,321 5/1987 Chang et al. ....................... 307/10.1

*Primary Examiner*—Jeffrey A. Gaffin

*Attorney, Agent, or Firm*—Finnegan, Henderson, Farabow, Garrett & Dunner

[57] ABSTRACT

In a load control device of the present invention, an operation signal provided by any one of a group of input switches in an operation input section is converted into a serial signal by a signal transmitting section, and the serial signal is applied through a serial signal line to a signal receiving section. In response to the serial signal, the signal receiving section outputs a response signal for driving a load, or a headlamp or a running light. When no response signal is provided, a NAND circuit applies a signal to an automatic lamp control section to automatically control the lighting of the lamp. That is, when the signal transmitting and receiving system becomes out of order, the lighting of the lamps is automatically controlled, which eliminates difficulties encountered when a vehicle is run during night.

15 Claims, 5 Drawing Sheets

POWER SOURCE SECTION
AUTOMATIC CONTROL SECTION
PRECIPITATION SENSOR
POWER CONTROL SECTION
SIGNAL RECEIVING SECTION
SIGNAL TRANSMITTING SECTION
26
24
24a
24b
23c
23d
23
20
20b
25
23a
23b
21
20a
22
19a
19b
19c
19
18
17
16a
16b
16c
16d
16
15

POWER SOURCE SECTION
14
10
11
9
POWER CONTROL SECTION
9a
9b
13
12
6
AUTOMATIC LAMP CONTROL SECTION
6c
6b
6a
7
ILLUMINANCE SENSOR
28
27
ABNORMAL CONDITION DETECTING SECTION
5a
5b
5c
5
SIGNAL RECEIVING SECTION
4
3
SIGNAL TRANSMITTING SECTION
2a
2b
2c
2d
2
1

14
POWER SOURCE SECTION
10
11
9
POWER CONTROL SECTION
29
MICROCOMPUTER
7
ILLUMINANCE SENSOR
4
3
SIGNAL TRANSMITTING SECTION
2a
2b
2c
2
1

START
S1
IS SERIAL SIGNAL NORMAL ?
YES
NO
S2
AUTO-MODE SET ?
YES
NO
S3
TURN ON HEAD LAMP ?
YES
NO
S4
TURN ON RUNNING LIGHT?
YES
NO
A
B
S5
TURN OFF
S6
IN RESPONSE TO THE OPERATION OF ANOTHER SWITCH
S7
DARK ?
YES
NO
S10
TWILIGHT ?
YES
NO
S8
TURN ON HEAD LAMP
S11
TURN OFF HEAD LAMP
S9
TURN ON RUNNING LIGHT
A
B

LOAD CONTROL DEVICE HAVING ABNORMAL CONDITION DETECTING FOR SERIAL SIGNAL LINE, TRANSMITTER AND RECEIVER

BACKGROUND OF THE INVENTION

This invention relates to a load control device in which, in response to operation signals from an operation input section having a plurality of input switches, signals are transmitted and received to control a load.

For instance in a vehicle such as an automobile, a number of signal lines or control lines are provided to drive a number of loads in response to operating signals from a number of operating switches, respectively. On the other hand, recently a method has been proposed in the art in which the number of signal lines or control lines are reduced, and operating signals are transmitted and received in a multiplex mode.

As is well known, a light switch is provided on the dashboard of an automobile. The light switch includes a plurality of positions for turning on and off the headlamps and the running lights, and an auto-mode setting switch. The auto-mode setting switch is operated for providing a mode of automatically controlling the lighting of lamps. When the auto-mode setting switch is turned on, the brightness of outside is detected with an illuminance sensor to determine whether it is "daytime", or "twilight (or down) time", or "night-time", and the lamps are controlled according to the results of determination; that is, when it is "twilight time", the running lights are lighted on, and when it is "night-time", the headlamps are turned on.

In this case, one signal line is used to control the operations of the lamps in cooperation with the switches, and signal conversion circuits are provided on the signal transmitting side and the signal receiving side, respectively. Serial signals are applied to the signal line, to allow the signal receiving side to determine which of the switches has been operated, thereby to turn on the headlamps or running lights; i.e., loads.

As is apparent from the above description, it is unnecessary to provide a plurality of signals lines for the switches. Accordingly, the labor and .time for wiring is reduced as much, and so is the manufacturing cost.

However, the above-described method is disadvantageous in the following points: For instance when the signal line is broken, or the signal transmitting side or the signal receiving side becomes out of order for some reason, it is impossible to turn on the lamps. In this case, it is impossible to turn on not only the running lights but also the headlamps. This is a serious trouble when the automobile is traveling on a dark road.

If the automobile is so designed that even when the above-described troubles occur, at least the headlamps can be turned on, then the automobile may be run during night, although it should be repaired later.

For this purpose, for instance the following means may be employed: An emergency by-pass line is provided between the headlamp lighting switch and the load control circuit so that, even in the above-described case, the lighting signal can be transmitted through the by-pass line.

However, this means is still disadvantageous in that it impairs the merit that the serial signal line is employed for multiplex signal transmission thereby to reduce the number of signal lines.

SUMMARY OF THE INVENTION

In view of the foregoing, an object of this invention is to provide a load control device which can handle abnormal conditions without increasing the number of signal lines.

The foregoing object of the invention has been achieved by the provision of a load control device which, according to the invention, comprises: an operation input section with a plurality of input switches; signal transmitting means for outputting through a serial signal line an operation signal provided in response to an operation of the operation input section; signal receiving means for outputting a response signal in response to the operation signal provided by the signal transmitting means; control means for outputting control signals according to external conditions; detecting means for detecting when the signal receiving means cannot output the response signal and for activating the control means; and load controlling means for controlling a load according to the response signal provided by the signal receiving means or the control signal provided by the control means.

In the load control device of the present invention, when any one of the input switches is operated, the signal transmitting means applies the operation signal through the serial signal line to the signal receiving means, and in response to the operation signal the signal receiving means applies the response signal to the load control means to control the load. When the signal receiving means cannot to output the response signal for instance because there is something wrong with the signal transmitting means or the serial signal line or the signal receiving means, the detecting means detects it and activates the control means. As a result, the load is automatically controlled by the control means according to the external conditions. In summary, even when the output signal of the operation input section is not sufficiently transmitted for some reason, the load can be automatically controlled according to the external conditions.

DETAILED DESCRIPTION OF PREFERRED EMBODIMENTS

Preferred embodiments of the present invention will now be described with the reference to the drawings.

A first embodiment of this invention, in which the technical concept of the invention is applied to a lamp lighting control section in an automobile, will be described with reference to FIG. 1.

Figure 1:
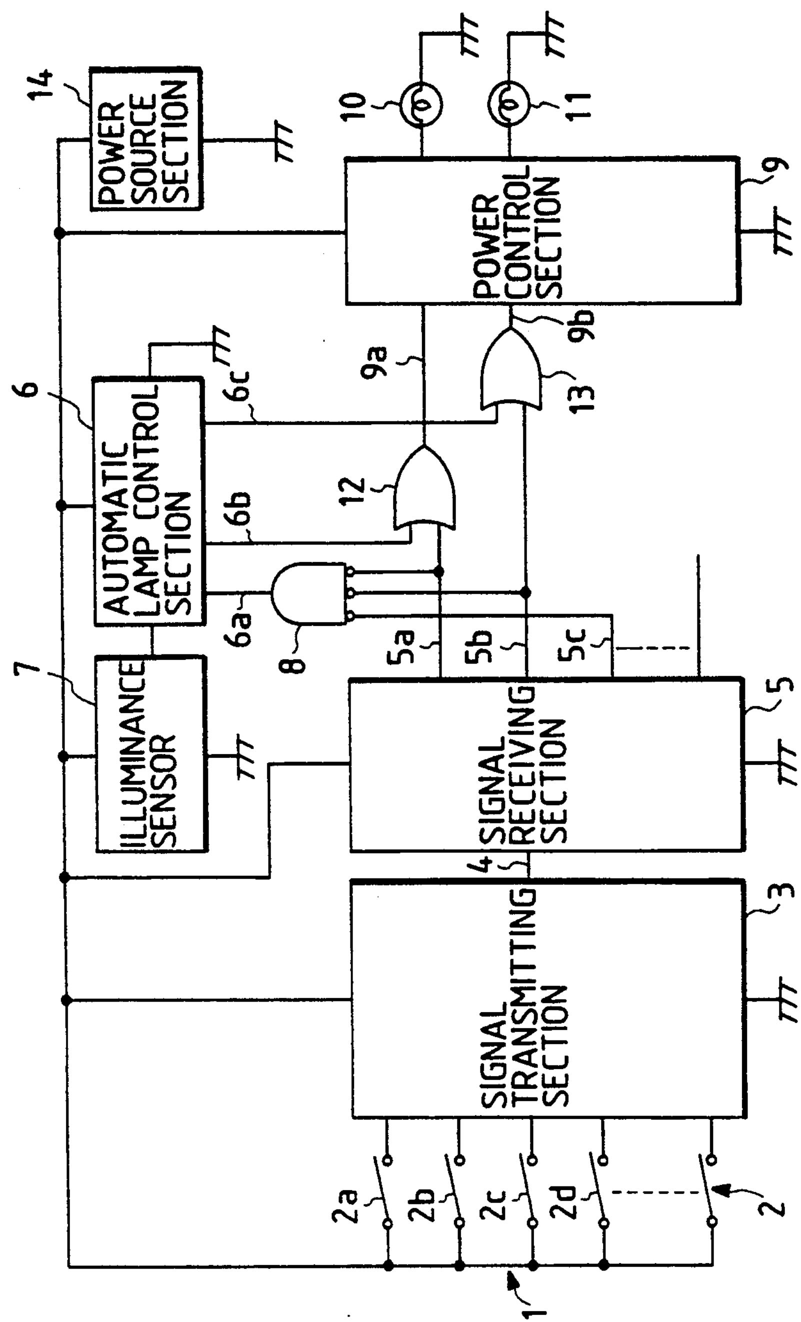
FIG. 1 is a block diagram showing the electrical arrangement of a first embodiment of this invention.

FIG. 1 shows the electrical arrangement of the first embodiment. Reference numeral 1 designates an operation input section 1 which is, for instance, a rotary change-over switch mounted on the steering wheel of the automobile. The operation input section 1 may be switched to a plurality of positions, to operate lamps as required. That is, the operation input section 1 is made up of a group of switches 2, namely, an auto-mode setting switch 2*a*, a headlamp lighting switch 2*b*, a small lamp lighting switch 2*c*, and an off switch 2*d*. Those switches 2*a* through 2*d* are selectively operated to turn on a desired lamp.

The group of input switches 2 is connected to signal transmitting means, namely, a signal transmitting section 3. The signal transmitting section 3 is so designed that, in response to an operation signal provided by any one of the input switches 2*a* through 2*d*, it outputs a serial signal through a serial signal line 4.

The serial signal line 4 is connected to signal receiving means, namely, a signal receiving section 5. The signal receiving section 5 is so designed that it converts the serial signal received through the serial signal line into a response signal corresponding to the operation signal, and applies it to the respective output terminal such as a headlamp output terminal 5*a*, a running light output terminal 5*b* or an off output terminal 5*c*.

Further in FIG. 1, reference numeral 6 designates control means, namely, an automatic lamp control section 6. When the sect-ion 6 enters an auto-mode, it outputs a control signal for controlling the lighting of a lamp according to an illuminance signal which is outputted by an illuminance sensor 7 adapted to detect the ambient brightness outside of the vehicle. The automatic lamp control section 6 has an input terminal 6*a*, a headlamp output terminal 6*b*, and a running light output terminal 6*c*. In the case of FIG. 1, when an "H" level signal is applied to the input terminal 6*a*, the section 6 is caused to enter the auto-mode.

The output terminals 5*a*, 5*b* and 5*c* of the signal receiving section 5 are connected to three input terminals of detecting means, namely, a NAND circuit 8, respectively, the output terminal of which is connected to the input terminal 6*a* of the automatic lamp control circuit 6. Load control means, namely, a power control section 9 is adapted to supply electric power to a headlamp 10 and a small lamp 11 connected, as loads, to the output terminals thereof. The power control section 9 has a headlamp input terminal 9*a* and a small lamp input terminal 9*b*.

The headlamp output terminal 5*a* of the signal receiving section 5 and the headlamp output terminal 6*b* of the automatic lamp control section 6 are connected through an OR circuit 12 to the input terminal 9*a* of the power control section 9. Both the running light output terminal 5*b* of the signal receiving section 5 and the running light output terminal 6*c* of the automatic lamp control section are connected through an OR circuit 13 to the input terminal 9*b* of the power control circuit 9. A power source section 14 is connected to the power input terminals of the above-described various sections. A DC source such as a vehicle battery applies a predetermined voltage to the power source section.

Now, the operation of the first embodiment thus organized will be described. First, it will be described with reference to the case where the signal transmitting section 3 and the signal receiving section 5 operate correctly, and the serial signal line 4 is satisfactory (not broken).

When, in the operation input section 2, the off switch 2*d* is turned on, the signal transmitting section 3 applies a serial signal indicating the off state to the serial signal line 4. In response to the serial signal, the signal receiving section 5 provides an "H" level signal at the off output terminal 5*c*. In this operation, the remaining output terminals 5*a* and 5*b* are at "L" level. Therefore, the NAND circuit 8 provides an "L" level output. Hence, the automatic lamp control section 6 is not caused to enter the auto-mode. Accordingly, no lamp lighting signals are applied to the input terminals 9*a* and 9*b* of the power control section 9; that is, the headlamp 10 and the running light 11 are maintained turned off.

When, in the operation input section 2, the running light lighting switch 2*c* is turned on, the signal transmitting section 3, similarly as in the above-described case, provides a running light lighting serial signal through the serial signal line 4. In response to this serial signal, the signal receiving section 5 provides an "H" level signal at the running light output terminal 5*b*. In this case, the remaining output terminals 5*a* and 5*c* are at "L" level. Therefore, the automatic lamp control section 6 is not in the auto-mode yet. The "H" level signal is further applied through the OR circuit 13 to the input terminal 9*b* of the power control section 9, so that the latter 9 turns on the running light 11.

When the operation input section 1 is switched to a headlamp lighting position, both the headlamp lighting switch 2*b* and the running light lighting switch 2*c* are turned on. In this case, similarly as in the above-described case, the running light 11 is turned on, and simultaneously a headlamp lighting signal is applied to the power control section 9, so that the headlamp 10 is turned on.

When, in the operation input section 2, the auto-mode setting switch 2*a* is turned on, the signal transmitting section 3 outputs an auto-mode setting serial signal through the serial signal line 4. In response to this serial signal, the signal receiving section 5 provides "L" level signals at all the output terminals 5*a*, 5*b* and 5*c*, so as to cause the automatic lamp control section to enter the auto-mode.

That is, the "L" level signals are applied to all the input terminals of the NAND circuit 8. As a result, the NAND circuit 8 outputs an "H" level signal, which is applied to the input terminal 6*a* of the automatic lamp control section 6. Hence, the automatic lamp control section 6 enters the auto-mode, so that it provides an output signal according to an illuminance signal outputted by the illuminance sensor 7 which indicates the brightness outside of the automobile. For instance when the illuminance sensor 7 determines that it is twilight, the automatic lamp control section 6 provides an "H" level output at the running light output terminal 6*c*; and when the sensor 7 determines that it is night, then the section 6 provides an "H" level output at the headlamp output terminal 6*b*.

In the case where, unlike the above-described case in which all operate correctly, signals cannot be transmitted nor received because there is something wrong with the signal transmitting section or the signal receiving section 5, or with the serial signal line 4; in other words, in the case where, even when any one of the input switches 2*a* through 2*d* of the operation input section 1 provided on the dashboard of the automobile is operated, no serial signal is transmitted to the signal receiving section 5, the circuit operates as follows:

That is, when no serial signal is applied through the serial signal line 4 to the signal receiving section 5, or the latter 5 itself is out of order, "L" level signals are provided at the output terminals 5*a* through 5*c*. Hence, similarly as in the above-described case where the automatic lamp control section 6 is in the auto-mode, the NAND circuit 8 applies an "H" level signal to the automatic lamp control section 6 so as to cause the latter 6 to enter the auto-mode.

Thus, in the above-described case, the automatic lamp control section is automatically caused to enter the auto-mode. Hence, even if it becomes impossible to switch the input condition with the operation input section, the automobile can be controlled satisfactorily in the lighting of the lamp 10 or the running light, although it should be repaired.

Figure 2:
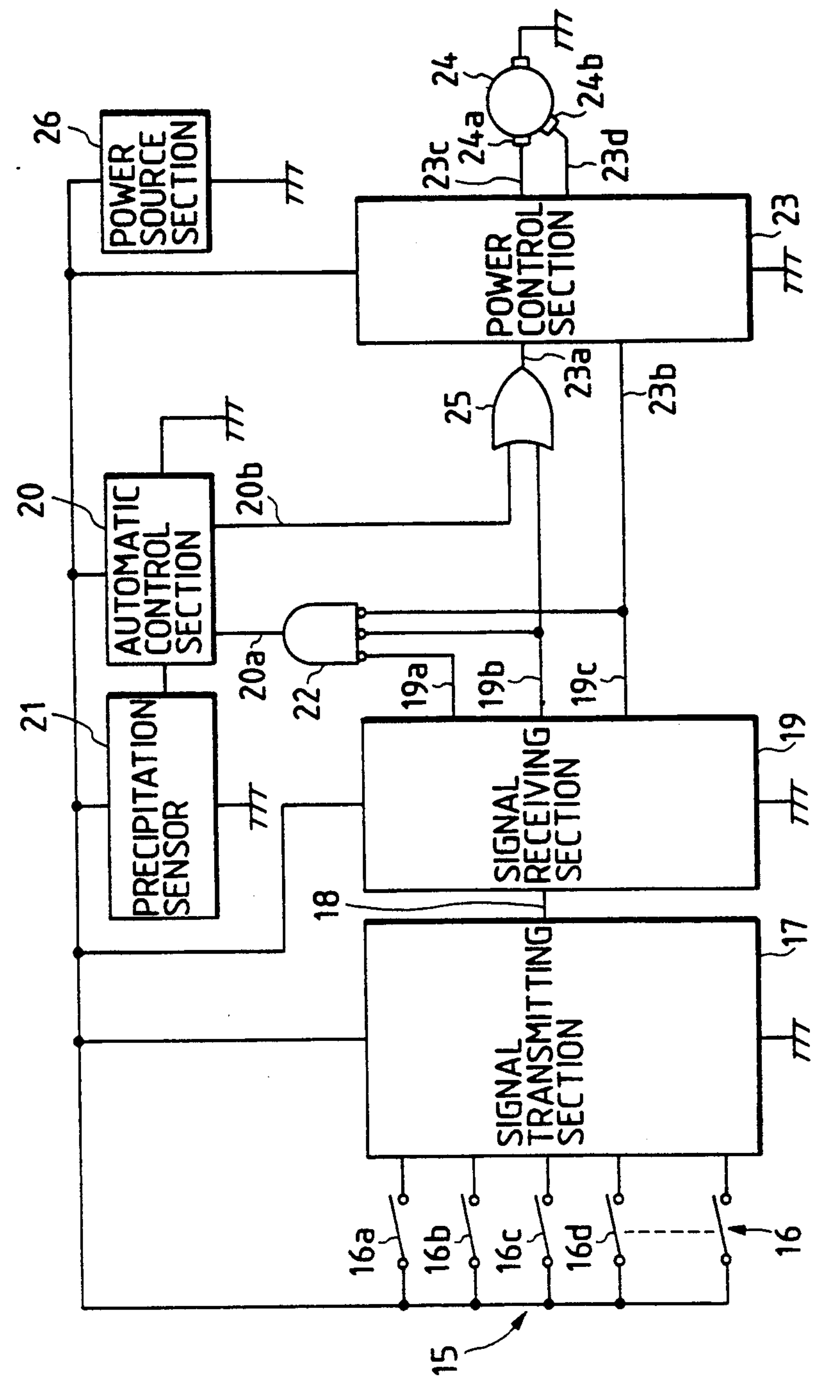
FIG. 2 is a block diagram showing a second embodiment of the invention.

FIG. 2 shows a second embodiment of the invention, in which the technical concept of the invention is applied to a load drive device for driving a load which is a wiper drive unit in this case.

FIG. 2 is a block diagram of FIG. 2 showing the electrical arrangement of the second embodiment. In FIG. 2, reference numeral 15 designates an operation input section 15 for a wiper, which is mounted on the steering wheel of the automobile. The operation input section 5 may be switched to various positions to set a plurality of wiper driving conditions, respectively. That is, the operation input section 5 is made up of a group of input switches 16, namely, an auto-mode setting switch 16*a*, a stop switch 16*b*, a low speed mode switch 16*c*, and a high speed mode switch 16*d*. Those switches 16 are selectively operated to drive the wiper as required.

The operation input section 15 is connected to signal transmitting means, namely, a signal transmitting section 17. The signal transmitting section 17 is so designed that, when, in the operation input section 15, any one of the input switches 16 outputs an operation signal, the section 17 outputs a serial signal through a serial signal line 18 according to the operation signal.

The serial signal line 18 is connected to signal receiving means, namely, a signal receiving section 19. The section 19 converts the serial signal applied thereto through the serial signal line 18 into a response signal corresponding to the operation signal. The response signal is applied to the respective output terminal, for instance, an off output terminal 19*a*, a low speed mode output terminal 19*b*, or a high speed mode output terminal 19*c*.

Further in FIG. 2, reference numeral 20 designates control means, namely, an automatic wiper control section 20 which is designed as follows: When the section 20 is in the auto-mode, it outputs a control signal for controlling the operation of the wiper according to a precipitation sensor 21 which is adapted to detect as an external condition the precipitation outside the automobile. The section 20 has an input terminal 20*a* and an output terminal 20*b*. In the case of FIG. 2, when an "H" level signal is applied to the input terminal 20*a*, the automatic wiper control section 20 is allowed to operate in the auto-mode.

The output terminals 19*a*, 19*b* and 19*c* of the signal receiving section 19 are connected to three input terminals of detecting means, namely, a NAND circuit 22, respectively. The output terminal of the NAND circuit 22 is connected to the input terminal 20*a* of the automatic wiper control section 20. Load control means, namely, a power control section 23 is adapted to drive a wiper motor 24 connected, as a load, to the output terminals 23*c* and 23*d* thereof. Those output terminals 23*c* and 23*d* are connected to a low speed mode setting input terminal 24*a* and a high speed mode setting input terminal 24*b* of the wiper motor 24, respectively.

The low speed mode setting output terminal 19*b* of the signal receiving section 19, and the output terminal 20*b* of the automatic wiper control section 20 are connected through an OR circuit 25 to an input terminal 23*a* of the power control section 23. A power source section 26 is connected to the power input terminals of the above-described various sections. A DC source such as a vehicle battery applies a predetermined voltage to the power source section.

The operation of the second embodiment thus organized will be described. First, it will be described with respect to the case where both the signal transmitting section 17 and the signal receiving section 19 operate correctly, and the serial signal line 18 is acceptable (not broken).

When, in the operation input section 15, the off switch 16*b* is turned on, the signal transmitting section 17 applies a serial signal indicating the off state to the serial signal line 18. In response to the serial signal thus outputted, the signal receiving section 19 provides an "H" level signal at the off output terminal 19*a*. In this case, the remaining outer terminals 19*b* and 19*c* are at "L" level. Therefore, the NAND circuit 22 provides an "L" level signal at its output terminal, and accordingly the automatic wiper control section 20 is not in the auto-mode yet. Hence, no wiper driving signal is applied to the input terminals 23*a* and 23*b* of the power control section 23, and therefore the wiper 24 is maintained stopped.

When, in the operation input section 15, the low speed mode setting switch 16*c* is turned on, then the signal transmitting section 17, similarly as in the above-described case, applies a low speed mode setting serial signal to the serial signal-line 18. In response to this serial signal, the signal receiving section 19 provides an "H" level signal at the low speed mode setting output terminal 19*b*. In this case, the remaining output terminals 19*a* and 19*c* are at "L" level, and therefore the automatic wiper control section 20 is not in the auto-mode yet. On the other hand, the "H" level signal is further applied through the OR circuit 25 to the power control section 23, to cause the latter 23 to energize the wiper motor 23 so that the latter rotates at low speed.

When the high speed mode setting switch 16*d* is turned on, similarly as in the above-described case an "H" level signal is applied to the input terminal 23*b* of the power control circuit, so that the wire motor 24 is rotated at high speed.

When, in the operation input section 15, the auto-mode setting switch 16*a* is turned on, the signal transmitting section 17 applies an auto-mode setting serial signal to the serial signal line 18. In response to this serial signal, the signal receiving section 19 provides "L" level signals at all the output terminals 19*a*, 19*b* and 19*c*.

That is, all the input terminals of the NAND circuit 22 are set to "L" level, so that the latter 22 applies an "H" level signal to the input terminal 20*a* of the automatic wiper control section 20, to cause the latter 20 to enter the auto-mode. Hence, when the precipitation sensor 21 adapted to detect the precipitation of outside outputs a precipitation signal indicating that the precipitation of outside has reached the value which requires the operation of the wiper, the automatic wiper control section 20 outputs an "H" level signal for driving the wiper. This "H" level signal is applied through the OR circuit 25 to the power control section 23 to cause the latter 23 to energize the wiper motor 24, so that the latter 24 is rotated at low speed.

In the case where, unlike the above-described case in which all operate correctly, signals cannot be transmitted nor received because there is something wrong with the signal transmitting section 17 or the signal receiving section 19, or with the serial signal line 18; in other words, in the case where, even when any one of the input switches 16*a* through 16*d* of the operation input section 15 provided on the dashboard of the automobile is operated, no serial signal is transmitted to the signal receiving section 19, the circuit operates as follows:

That is, when no serial signal is applied through the serial signal line 18 to the signal receiving section 19, or the latter 19 itself is out of order, "L" level signals are provided at the output terminals 19*a* through 19*c*. Therefore, similarly as in the above-described auto-mode Setting operation, the automatic wiper control section receives an "H" level signal from the NAND circuit 22.

Hence, even if the above-described trouble occurs while it is raining, the wiper is operated as follows: That is, when the precipitation reaches a predetermined value, the automatic wiper control section 20 is automatically activated so as to rotate the wiper motor 24 at low speed, thereby to drive the wiper.

Figure 3:
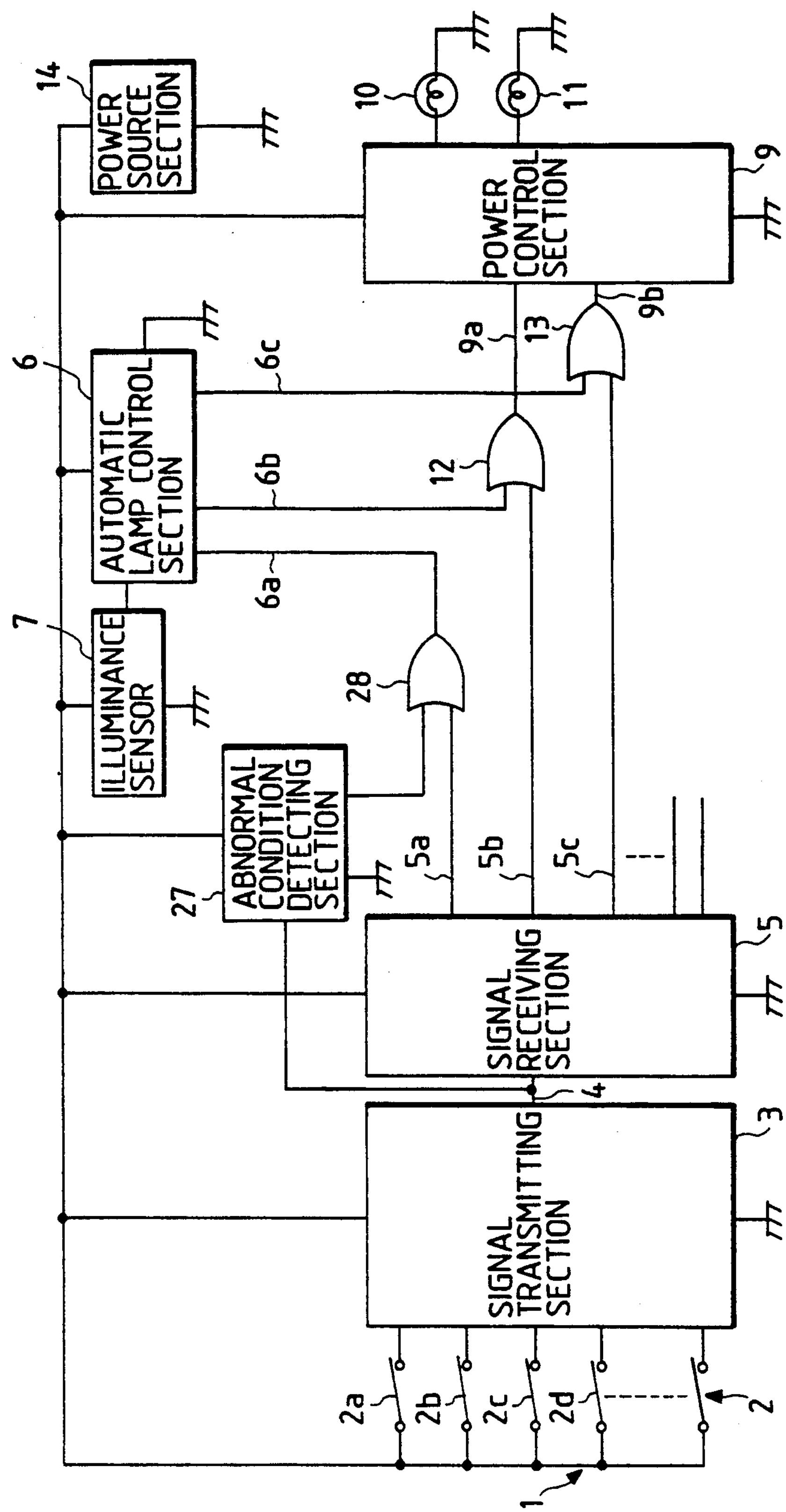
FIG. 3 is a block diagram showing a third embodiment of the invention.

FIG. 3 shows a third embodiment of the invention. The third embodiment is different from the first embodiment in that, in place of the detecting means, namely, the NAND circuit 8, an abnormal condition detecting section 27 is provided, and an OR circuit 28 is added.

That is, the abnormal condition detecting section 27 detects whether or not a serial signal is applied to the serial signal line 4, and outputs an "H" level signal when it detects no serial signal. The section 27 has an input terminal connected to the serial signal line 4, and an output terminal connected through the OR circuit 28 to the auto-mode setting input terminal 6*a* of the automatic lamp control section 6. The auto-mode setting output terminal 5*a* of the signal receiving section 5 is also connected through the OR circuit 28 to the auto-mode setting input terminal 6*a* of the automatic lamp control section 6.

In the case where no serial signal is received through the serial signal line 4 by the signal receiving section 5, for instance, because the signal receiving section is out of order, or the serial signal line is broken, the abnormal condition detecting section 27 detects it, and provides an "H" level signal at the output terminal.

As a result, the automatic lamp control section 6 enters the auto-mode, so that the lighting of the running light 11 or the headlamp 10 is automatically controlled according to the ambient brightness. Thus, the third embodiment has the same effects as the first embodiment.

Figure 4:
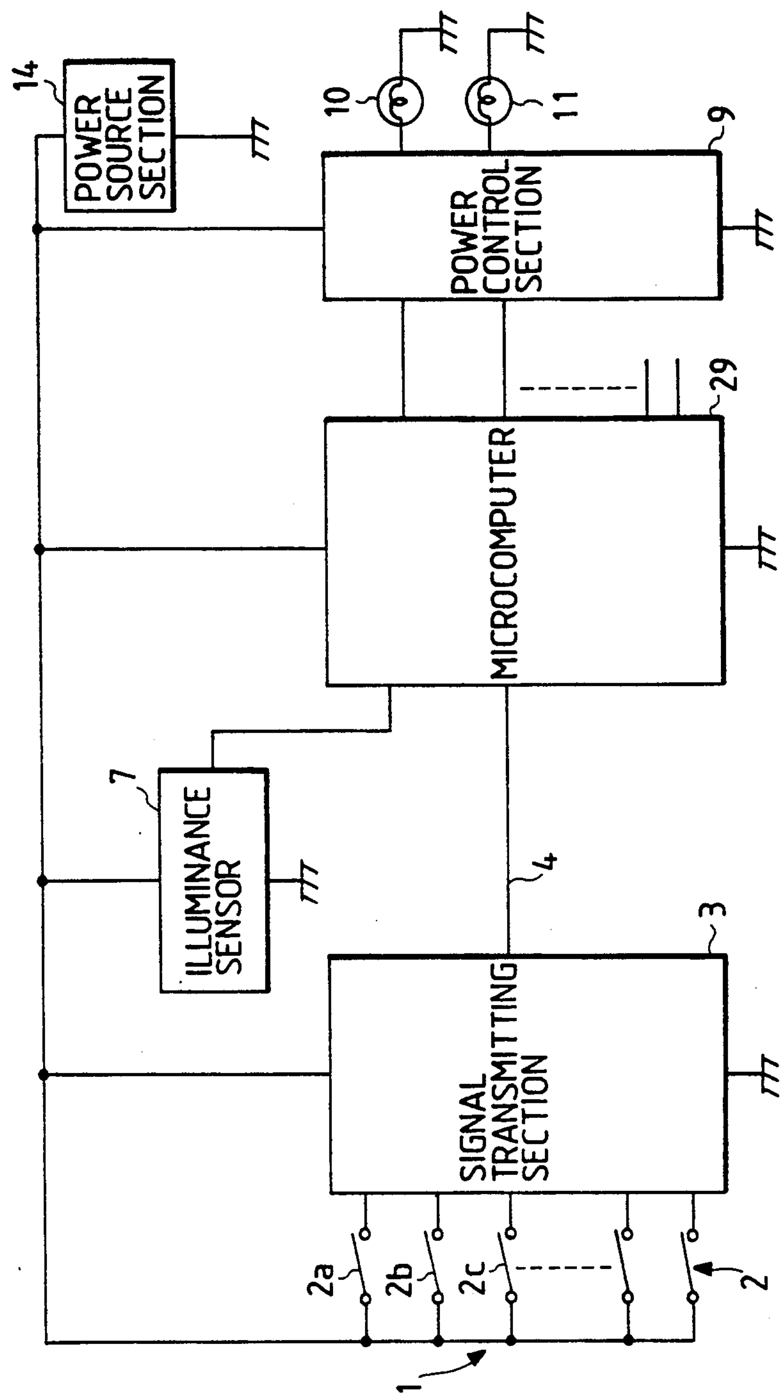
FIG. 4 is a block diagram showing a fourth embodiment of the invention.
Figure 5:
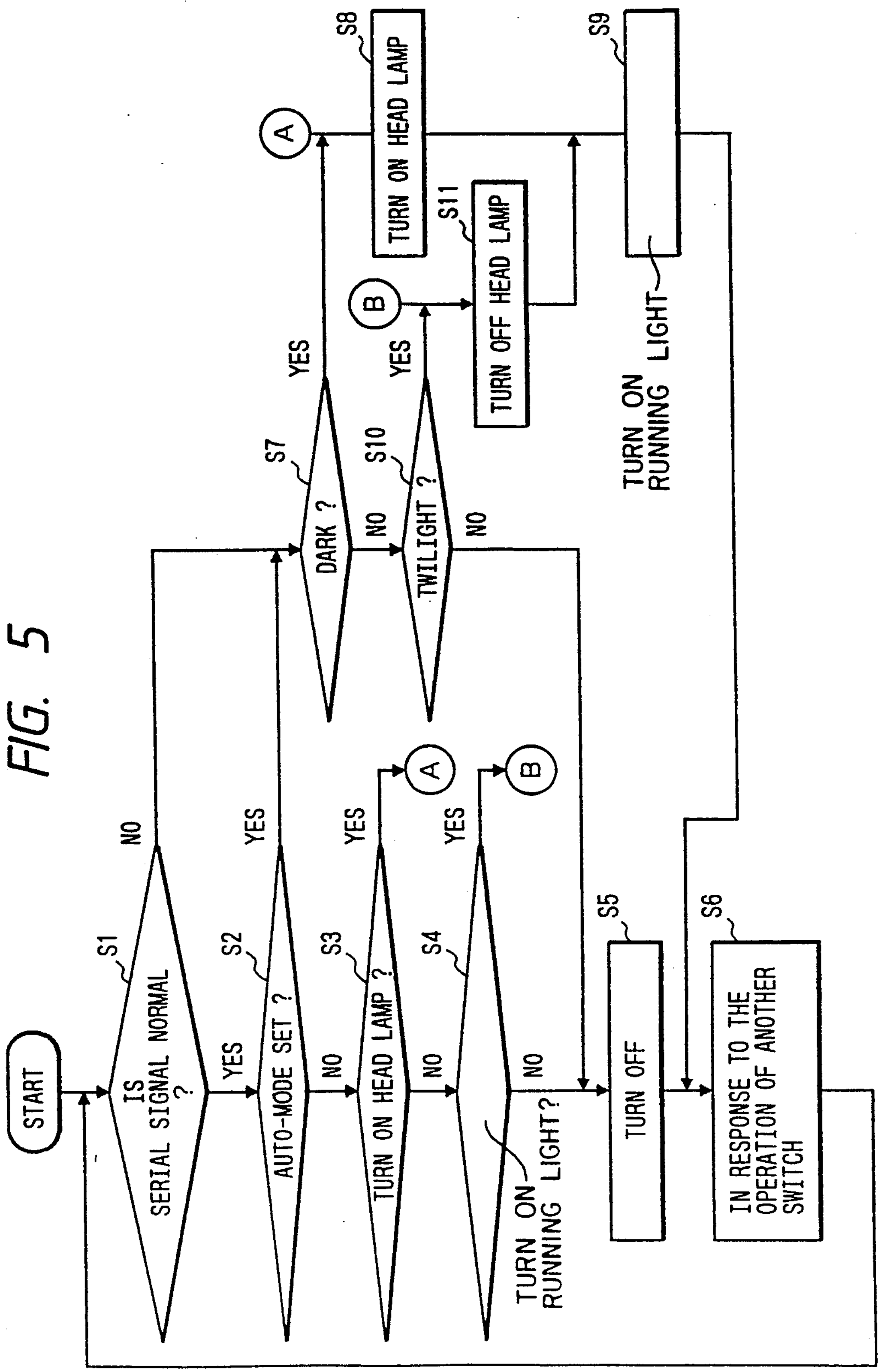
FIG. 5 is a flow chart showing a program for a microcomputer in the fourth embodiment.

FIGS. 4 and 5 shows a fourth embodiment of the invention. The fourth embodiment is different from the first embodiment in that it has a microcomputer 29 instead of the detecting means, namely, the NAND circuit 8, the signal receiving means and the control means, and is operated according to a program shown in FIG. 5.

That is, the serial signal line 4 and the illuminance sensor 7 are connected to the input terminals of the microcomputer-29, output terminals of which are connected to the headlamp lighting input terminal and the running light lighting input terminal of the power control section 9.

In the circuit described above, the microcomputer 29 executes the program according to a flow chart of FIG. 5 upon reception of a serial signal through the serial signal line 4 from the signal transmitting section.

In Step S1, the microcomputer 29 determines whether or not the serial signal received is normal. When it is normal (the result of determination is "Yes"), Step S2 is effected. For instance in the case where the given serial signal is the off state setting one, in Steps S2, S3 and S4 the results of determination by the microcomputer are "No", and therefore Step S5 is effected.

In Step S5, the microcomputer 29 outputs a signal for turning off the headlamp 10 and the running light 11. Therefore, in the case where the headlamp 10 or the running light 11 has been lighted on, it is turned off; and in the case where the headlamp 10 or the running light 11 has been turned off, it is maintained turned off. In the case where another serial signal is provided in response to the operation of another switches, it is processed in Step S6, and thereafter Step S1 is effected again.

In the case where an auto-mode setting serial signal is applied to the microcomputer 29, in Step S2 the result of determination by the latter 29 is "Yes", and Step S7 is effected. In this case, the microcomputer 29, in response to the illuminance signal which the illuminance sensor 7 outputs according to the ambient brightness, operates as follows:

For instance in the case where the given illuminance signal indicates that it is night and dark, in Step S7 the result of determination is "Yes", and therefore Step S8 is effected, so that the headlamp 10 is turned on, and in Step S9 the running light 11 is turned on.

In the case where the given illuminance signal indicates that it is twilight, in Step S7 the result of determination is "No", and Step S10 is effected. In Step S10, the result of determination is "Yes", and Step S11 is effected. In Step S11, the microcomputer 29 outputs a control signal to turn off the headlamp, and in Step S9 it outputs a control signal to turn on the running light 11.

In the case where the illuminance sensor 7 outputs no illuminance signal which indicates that it is light outside; that is, in the case where it is light outside, in Steps S7 and S10 the results of determinations are "No", and Step S5 is effected. In Step S5, the lamps are turned off similarly as in the above-described case. Thereafter, Step S6 is effected, and then Step S1 is effected again.

When the headlamp lighting serial signal is provided, in Step S3 the result of determination by the microcomputer 29 is "Yes", and Step S8 is effected to turn on the headlamp 10. Similarly, when the running light lighting serial signal is provided, in Step S4 the result of determination by the microcomputer 29 is "Yes", and Step S11 is effected to turn on the running light 11.

When, unlike the above-described case, no normal serial signal is given, in Step S1 the result of determination by the microcomputer 29 is "No", and Step S7 is effected. Thereafter, the same Steps are effected as those in the above-described auto-mode setting case, so that the headlamp 10 or the running light 11 is turned on.

Thus, when no operation signal outputted by the operation input section 1 is applied to the microcomputer 29, the latter 29 determines that an abnormal condition has occurred, and automatically performs the control as in the auto-mode. Thus, the fourth and fifth embodiments have the same effects as the first embodiment.

While a few embodiments of the invention have been described with reference to the operation of controlling the lighting of the lamps on a vehicle or the driving of the wiper, the invention is not limited thereto or thereby. That is, various changes and modifications may be made therein without departing from the invention. As the technical concept of the invention may be applied to all devices in which signals are transmitted and received through a serial signal line.

As was described above, with the load control device of the invention, when the signal receiving means cannot output the response signal, the detecting means detects it to activate the control means. Therefore, even in the case where the signal transmitting means or the signal receiving means is out of order, or the serial signal line is broken, the control means can control the load according to the external conditions; that is, when any or both of the signal transmitting and receiving system is or are out of order, the least possible operations can be achieved as required. This effect should be highly appreciated in practical use.

What is claimed is:

1. A load control device comprising:

an operation input section provided with a plurality of input switches;

signal transmitting means for outputting an operation signal provided in response to an operation of said operation input section through a serial signal line;

sensor means for outputting a detecting signal in accordance with external conditions;

signal receiving and control means including a control section for outputting a control signal in response to at least one signal of the group consisting of (1) a signal derived from said operation signal and (2) said detecting signal, said signal receiving and control means including a signal receiving section responding to an abnormal condition of said signal transmitting means or said serial signal line or to an abnormal internal condition to yield an abnormal signal as said derived signal; and load controlling means for controlling a load in accordance with said control signal of said control means.

2. The load control device as claimed in claim 1, wherein said signal receiving section includes:

means for outputting a null signal as the derived signal in response to operation of a particular one of said input switches.

3. The load control device as claimed in claim 2, wherein the signal receiving and control means includes a signal receiving section that yields a null signal as the derived signal upon internal failure.

4. The load control device as claimed in claim 3, wherein said abnormal condition is such that no serial signal is applied through said serial signal line to said signal receiving section by said operation of said operation input section.

5. The load control device as claimed in claim 1, including said serial signal line and wherein said signal receiving and control means includes a circuit connected to said serial signal line to detect at least one of the abnormal conditions.

6. The load control device as claimed in 1, wherein said signal receiving and control means controls said load control means by said control signal generated in response to said detecting signal of said sensor means when said abnormal signal is applied to said control means.

7. The load control device as claimed in claim 1, wherein said sensor means includes an illuminance sensor.

8. The load control device as claimed in claim 1, wherein said sensor means includes a precipitation sensor.

9. A load control device comprising:

an operation input section including a plurality of input switches;

signal transmitting means for outputting a respective operation signal in response to operation of each of said switches, a serial signal line for carrying said operation signal;

means for generating an automatic signal;

means for controlling the load in response to at least one signal of a group consisting of the automatic signal and a second signal; and signal receiving means coupled to the serial signal line for receiving the operation signal and generating the second signal, including means for yielding a null signal as the second signal in response to each of the following conditions: (1) a particular operation signal, (2) an abnormal condition of the signal transmitting means, (3) an abnormal condition of the serial signal line, and (4) an abnormal internal condition within the signal receiving means.

10. A load control device as claimed in claim 9, wherein a particular one of the input switches is associated with selection of an automatic operation mode and is operated to generate the particular operation signal.

11. The load control device as claimed in claim 9, wherein the means for yielding a null signal as the second signal responds to an abnormal condition of the signal transmitting means in which no operation signal is transmitted and responds to an abnormal condition of the serial signal line in which no operation signal is received by the signal receiving means.

12. The load control device as claimed in claim 9, wherein the means for generating an automatic signal comprises means for responding to an external condition.

13. The load control device as claimed in claim 12, wherein the means for responding to an external condition responds to illumination or precipitation.

14. The load control device as claimed in claim 9, wherein the means for controlling the load and the signal receiving means together comprise a digital logic arrangement.

15. The load control device as claimed in claim 14, wherein the digital logic arrangement includes a microcomputer.

* * * * *